(12) United States Patent
Kohara et al.

(10) Patent No.: US 9,940,090 B2
(45) Date of Patent: Apr. 10, 2018

(54) SYNCHRONIZED PLAYBACK SYSTEM, SYNCHRONIZED PLAYBACK APPARATUS, AND CONTROL METHOD

(71) Applicant: YAMAHA CORPORATION, Hamamatsu-shi, Shizuoka (JP)

(72) Inventors: Osamu Kohara, Hamamatsu (JP); Tetsuya Matsuyama, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/037,543

(22) PCT Filed: Nov. 18, 2014

(86) PCT No.: PCT/JP2014/080549
§ 371 (c)(1),
(2) Date: May 18, 2016

(87) PCT Pub. No.: WO2015/076273
PCT Pub. Date: May 28, 2015

(65) Prior Publication Data
US 2016/0291925 A1    Oct. 6, 2016

(30) Foreign Application Priority Data

Nov. 20, 2013 (JP) ................................ 2013-240102

(51) Int. Cl.
*G06F 17/00* (2006.01)
*G06F 3/16* (2006.01)
(Continued)

(52) U.S. Cl.
CPC ......... *G06F 3/16* (2013.01); *H04N 21/41407* (2013.01); *H04N 21/4307* (2013.01); *H04N 21/43615* (2013.01); *H04N 21/8106* (2013.01)

(58) Field of Classification Search
CPC .... G06F 3/16; H04N 21/431; H04N 21/4302; H04N 21/4305; H04N 21/4307;
(Continued)

(56) References Cited

U.S. PATENT DOCUMENTS 8,483,853 B1    7/2013 Lambourne
2002/0072816 A1*    6/2002 Shdema ............. H04L 12/2805
                                                              700/94
(Continued)

FOREIGN PATENT DOCUMENTS

JP    2005100030 A    4/2005
JP    2011228784 A    11/2011
(Continued)

OTHER PUBLICATIONS

Oxford English Dictionry entry for "gist," retrieved Jun. 22, 2017.*
(Continued)

*Primary Examiner* — Andrew C Flanders
(74) *Attorney, Agent, or Firm* — Rossi, Kimms & McDowell LLP

(57) ABSTRACT

In a synchronized playback system, a plurality of synchronized playback apparatuses are connected and perform synchronized playback. Each of the plurality of synchronized playback apparatuses includes a playback device that reproduces a content file which is delivered through a network from a delivery server, in which the content file is stored, and a control device that controls the synchronized playback. One of the plurality of synchronized playback apparatuses causes the control device to operate in a case in which the synchronized playback is performed and control the synchronized playback of a plurality of synchronized playback devices, which participate in a synchronized playback group, of the playback devices which are included in the plurality of respective synchronized playback apparatuses.

8 Claims, 11 Drawing Sheets

(51) Int. Cl.
*H04N 21/414* (2011.01)
*H04N 21/43* (2011.01)
*H04N 21/436* (2011.01)
*H04N 21/81* (2011.01)

(58) Field of Classification Search
CPC .. H04N 5/04; H04N 5/05; H04N 5/06; H04N 5/067; H04W 56/00; H04W 56/0005; H04W 56/001; H04W 56/0015; H04W 56/002; H04W 84/20; H04H 20/18; H04H 20/26; H04R 2227/005
See application file for complete search history.

(56) References Cited

U.S. PATENT DOCUMENTS

| | | | | |
|---|---|---|---|---|
| 2003/0023331 | A1* | 1/2003 | Komura | H04S 1/00 700/94 |
| 2003/0200001 | A1* | 10/2003 | Goddard | H04L 12/2803 700/94 |
| 2004/0059446 | A1* | 3/2004 | Goldberg | G11B 20/10009 700/94 |
| 2006/0149850 | A1* | 7/2006 | Bowman | G11B 27/10 709/231 |
| 2006/0270395 | A1* | 11/2006 | Dhawan | H04M 1/7253 455/418 |
| 2007/0038999 | A1* | 2/2007 | Millington | H04J 3/0664 718/100 |
| 2007/0297459 | A1* | 12/2007 | Cucos | H04J 3/07 370/505 |
| 2008/0045140 | A1* | 2/2008 | Korhonen | H04M 1/7253 455/3.06 |
| 2009/0190582 | A1* | 7/2009 | Nambiath | H04N 21/43615 370/389 |
| 2009/0222520 | A1 | 9/2009 | Sloo et al. | |
| 2013/0174204 | A1 | 7/2013 | Coburn, IV et al. | |
| 2013/0243199 | A1* | 9/2013 | Kallai | H04N 21/4852 381/17 |
| 2013/0251329 | A1 | 9/2013 | McCoy et al. | |
| 2013/0346859 | A1* | 12/2013 | Bates | H04N 21/25816 715/716 |
| 2014/0010515 | A1* | 1/2014 | Lee | H04L 65/605 386/207 |
| 2015/0100143 | A1* | 4/2015 | Gao | H04L 65/4076 700/94 |

FOREIGN PATENT DOCUMENTS

| | | |
|---|---|---|
| JP | 2012019456 A | 1/2012 |
| JP | 2012109677 A | 6/2012 |

OTHER PUBLICATIONS

Extended European Search Report issued in European Appln. No. 14864259.8 dated May 16, 2017.
International Search Report issued in Intl. Appln. No. PCT/JP2014/080549 dated Jan. 20, 2015. English translation provided.
Written Opinion issued in Intl. Appln. No. PCT/JP2014/080549 dated Jan. 20, 2015.
Written Opinion issued in International Patent Application No. PCT/JP2014/080549 dated Jan. 20, 2015. English translation provided.
Office Action issued in Japanese Application No. 2013-0240102 dated May 9, 2017. Machine English translation provided.

* cited by examiner

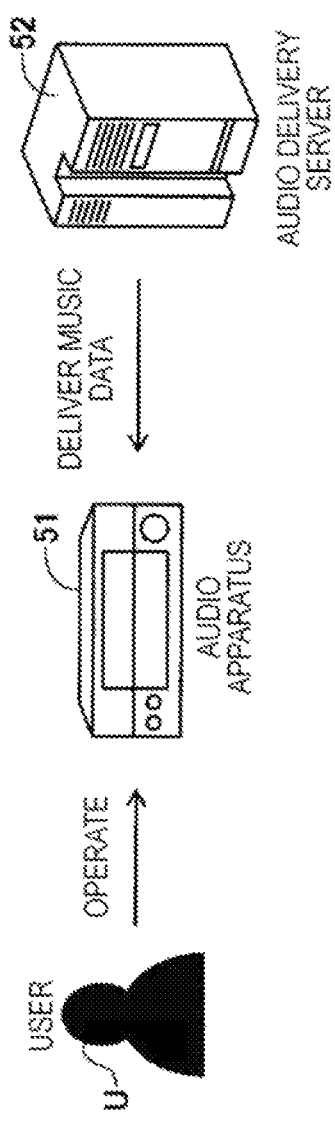
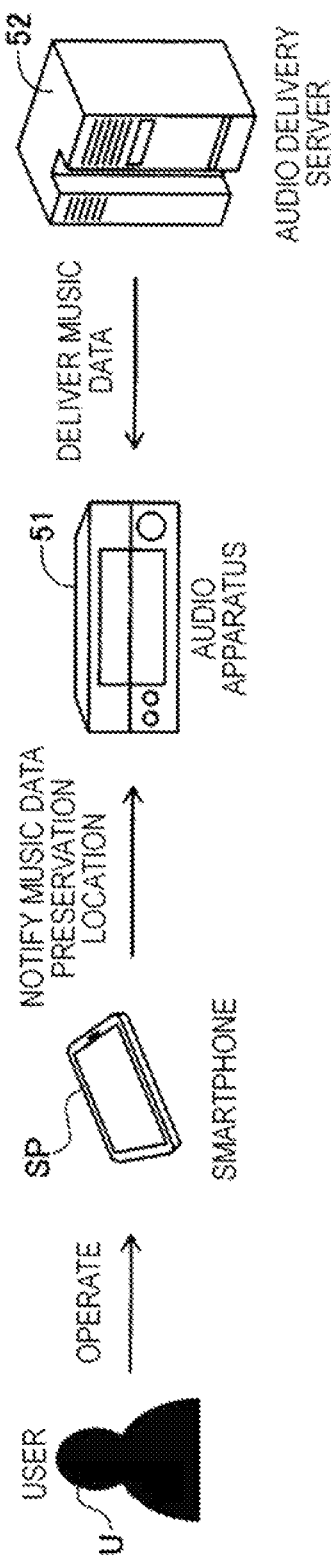

SYNCHRONIZED PLAYBACK SYSTEM, SYNCHRONIZED PLAYBACK APPARATUS, AND CONTROL METHOD

TECHNICAL FIELD

The present invention relates to a technology in which a plurality of playback apparatuses synchronize and reproduce a content file such as music data.

BACKGROUND ART

As specifications for constructing a home network, to which a plurality of electronic apparatuses, such as home appliances, a portable terminal, and a personal computer, are connected, there is, for example, the Digital Living Network Alliance (DLNA, registered trade mark). In the DLNA, specifications (guidelines) are established in which, for example, both audio apparatuses and a personal computer are connected to the network and a content file, such as music, a moving picture, or a still image, is reproduced.

FIG. 9(a) illustrates an example of a processing operation in which an audio apparatus 51, which is connected through a network that satisfies the specifications for constructing the above-described home network, reproduces the music data which is stored in an audio delivery server 52. The audio apparatus 51 includes, for example, an AV amplifier and an AV receiver. The audio delivery server 52 is, for example, a network storage in which a plurality of music data is stored. Furthermore, for example, the music data, which are respectively associated with the plurality of audio delivery servers 52 on the network and are stored in the respective audio delivery servers 52, are displayed as a playlist on a remote controller, which belongs to the audio apparatus 51, or a fluorescent display tube (hereinafter, described as a "body FL") which is arranged on the front side of the body of the apparatus. The user U selects a favorite piece of music from the playlist according to the display of the remote controller or the body FL. The audio apparatus 51 performs a process of requesting the music data from the audio delivery server 52 which stores the selected music. The audio delivery server 52 delivers the requested music data to the audio apparatus 51. The audio apparatus 51 outputs the music data, which is delivered from the audio delivery server 52, through a speaker.

In addition, FIG. 9(b) illustrates an example of a processing operation of using the smartphone SP as the remote controller and operating the audio apparatus 51. In the smartphone SP, for example, an application which satisfies the specifications of the DLNA is installed, and a playlist of the music data, which are stored in the audio delivery server 52 on the network, is displayed. In a case in which the user U selects a piece of music from the playlist, the application of the smartphone SP performs a process of notifying information or the like, which indicates the audio delivery server 52 in which the name of the selected piece of music or the music data corresponding to the selected piece of music is stored, to the audio apparatus 51. The audio apparatus 51 acquires the music data corresponding to the piece of music selected by the user U from the audio delivery server 52 based on information which is notified from the smartphone SP.

In addition, for the system which operates the above-described one audio apparatus, there is provided a synchronized playback system (for example, Patent Literature 1 or the like) in which music data, which is stored in an audio delivery server, is simultaneously delivered to a plurality of audio apparatuses and the respective audio apparatuses are synchronized and reproduce the music data. In the synchronized playback system disclosed in Patent Literature 1, control is performed in such a way that one of a plurality of terminal apparatuses (audio apparatuses or the like) serves as a reference terminal apparatus and the other apparatuses serve as subordinate terminal apparatuses, thereby performing synchronized playback between the respective terminal apparatuses without using a time delivery server for synchronized playback.

An example of a processing operation of the synchronized playback performed by the plurality of audio apparatuses which are connected to the same network as described above will be described with reference to FIG. 10. In a personal computer 55 illustrated in FIG. 10, software, which is capable of performing a process of managing or reproducing a piece of music, is installed. The user U selects, for example, a favorite piece of music from the library of the software. The software which is executed in the personal computer 55 performs, for example, streaming delivery of the music data of the selected piece of music toward the plurality of audio apparatuses 56, thereby implementing synchronized playback by the plurality of audio apparatuses 56.

CITATION LIST

Patent Literature

Patent Literature 1: JP-A-2012-19456

SUMMARY OF INVENTION

Technical Problem

However, in the above-described synchronized playback system, only the personal computer 55, on which management software is installed, has a function of controlling the synchronized playback. If connection with the network is terminated in order to use the personal computer 55 in another place, it is difficult to perform synchronized playback by the audio apparatuses 56. In addition, in the synchronized playback system, in a case in which a new audio apparatus is connected to the network which performs synchronized playback, the personal computer, on which the management software is installed, is required to add the audio apparatus to a synchronized playback group. Accordingly, in the above-described synchronized playback system, the function of controlling synchronized playback is fixed to a specific apparatus, and thus it is difficult to sufficiently cope with the change in the configuration of the network.

A technology disclosed in the present application is provided to solve the above problems. An object of the present invention is to provide a technology which is capable of flexibly coping with the change in the configuration of the network which performs synchronized playback.

Solution to Problem

A synchronized playback system according to a technique disclosed in the present application is a synchronized playback system in which a plurality of synchronized playback apparatuses are connected and perform synchronized playback, each of the plurality of synchronized playback apparatuses including a playback device that reproduces a content file which is delivered through a network from a delivery server, in which the content file is stored, and a control device that controls the synchronized playback, wherein one of the plurality of synchronized playback apparatuses causes the control device to operate in a case in which the synchronized playback is performed and control the synchronized playback of a plurality of synchronized playback devices, which participate in a synchronized playback group, of the playback devices which are included in the plurality of respective synchronized playback apparatuses.

In the synchronized playback system, each of the synchronized playback apparatuses includes the control device and the playback device. Meanwhile, here, the devices are programs, such as processing modules, which realize, for example, desired functions, are stored in memories or the like of the synchronized playback apparatuses, and are appropriately executed and operated. In addition, in the synchronized playback system, it is not necessary for all of the synchronized playback apparatuses to include the control devices. In the synchronized playback system, one of the plurality of synchronized playback apparatuses which participate in the synchronized playback group operates the control device in a case in which the synchronized playback is performed. The synchronized playback apparatus, in which the control device operates, controls the playback devices, which are included in other synchronized playback apparatuses that participate in the synchronized playback group, as the synchronized playback devices which perform the synchronized playback. In the configuration, it is possible for any one of the synchronized playback apparatuses, which participate in the synchronized playback group, to perform the synchronized playback by dynamically functioning as the control device and controlling the playback devices of other synchronized playback apparatuses. Accordingly, in a case in which a function which is necessary for the synchronized playback is dynamically allocated to the synchronized playback apparatuses which are connected to the network, it is possible to configure the synchronized playback system which can flexibly cope with the change in the configuration of a network.

The synchronized playback system according to the technique disclosed in the present application may be also configured such that each of the plurality of synchronized playback apparatuses further includes a master device, and one of the plurality of synchronized playback apparatuses causes the master device to operate and select the plurality of synchronized playback devices from among the playback devices which are included in the plurality of respective synchronized playback apparatuses according to designation of the synchronized playback devices which participate in the synchronized playback group, and causes one of the plurality of synchronized playback apparatuses that includes the selected synchronized playback device to operate the control device.

In the synchronized playback system, any one of the synchronized playback apparatuses includes a master device in addition to the playback device and the control device. The master device constructs the synchronized playback group which performs the synchronized playback. The master device selects a plurality of synchronized playback devices from the playback devices, which are included in the plurality of respective synchronized playback apparatuses, according to designation of the synchronized playback device which participates in the synchronized playback group. The designation of the synchronized playback device is performed by, for example, the user. In addition, the playback device, in which participation or non-participation is designated, includes a synchronized playback device which is participating in another group. The master device causes one of the synchronized playback apparatuses, which include the plurality of selected synchronized playback devices, to operate the control device. The master device dynamically selects an apparatus which operates the control device from among, for example, the synchronized playback apparatuses which include the synchronized playback devices. In the configuration, in a case in which the synchronized playback device, which will be caused to participate in the synchronized playback group, is designated for the synchronized playback apparatus which includes the master device, the master device automatically selects an apparatus which operates the control device from among the synchronized playback apparatuses in the synchronized playback group. Accordingly, it is possible to configure the synchronized playback system which can flexibly cope with the change in the configuration of the network.

The synchronized playback system according to the technique disclosed in the present application may be also configured such that in addition to the synchronized playback apparatuses which include the control devices, the playback device of a synchronized playback apparatus, which do not include the control device, participates in the synchronized playback group to serve as the synchronized playback device.

In the synchronized playback system, it is possible to cause the playback devices of the synchronized playback apparatuses to operate as the synchronized playback devices and to participate in the synchronized playback group even in a case of the synchronized playback apparatuses which do not include the control device.

The synchronized playback system according to the technique disclosed in the present application may be also configured such that the master device searches for the plurality of playback devices which are connected to the network, and the playback devices respond to the master device with pieces of information relevant to construction of the synchronized playback group according to the search performed by the master device.

In the synchronized playback system, the master device searches for the playback devices which are connected to the network. In contrast, the playback devices respond with pieces of information relevant to the construction of the synchronized playback group. Therefore, for example, the apparatus which includes the master device displays the pieces of information received from the playback devices, and thus the user can easily select a synchronized playback device, which is desired to participate in the synchronized playback group, from among the playback devices on the network.

The synchronized playback system according to the technique disclosed in the present application may be also configured such that in a case where the synchronized playback device, which participates in a first synchronized playback group that has been constructed, is designated to participate in a new second synchronized playback group, the synchronized playback device provides a gist that the synchronized playback device leaves the first synchronized playback group, to the control device of the first synchronized playback group, and the control device of the first synchronized playback group updates pieces of information of the synchronized playback devices which participate in the first synchronized playback group, and notifies a gist that an updating process is completed, to the leaving synchronized playback device.

In the synchronized playback system, the synchronized playback device, which already participates in the first synchronized playback group, performs a process of leaving the group after performing a checking process on the control device of an existing group in a case in which, for example, the user performs an operation of causing the synchronized playback device to participate in another second synchronized playback group. Therefore, it is possible to configure the synchronized playback system which appropriately performs a process relevant to movement of the synchronized playback device between the groups and flexibly changes the configuration of the network for a request of the user.

The synchronized playback system according to the technique disclosed in the present application may be also configured such that in a case where the control device, which participates in a first synchronized playback group that has been constructed, is designated to participate in a new second synchronized playback group, the control device selects a synchronized playback device that will be a new control device from among the synchronized playback devices which participate in the first synchronized playback group, and the synchronized playback device, which is selected as the new control device, performs an updating process of deleting information of the synchronized playback device corresponding to the leaving control device from content of the pieces of information of the synchronized playback devices which participate in the first synchronized playback group, notifies a gist that the updating process is completed, to the synchronized playback device corresponding to the leaving control device, and notifies a gist that an operation as the control device starts, to other synchronized playback devices which participate in the first synchronized playback group.

In the synchronized playback system, the control device, which already participates in the first synchronized playback group, selects a synchronized playback device which serves as a new control device from among the synchronized playback devices which participates in the existing group in a case in which, for example, the user performs an operation of causing the control device to participate in another second synchronized playback group. The synchronized playback device, which is newly selected as the control device, updates the pieces of information of the synchronized playback devices which participate in the first synchronized playback group, and notifies a gist that the updating process is completed, to the synchronized playback device corresponding to the leaving control device. In addition, the synchronized playback device, which is newly selected as the control device, performs a process of notifying a gist that the synchronized playback device starts an operation as the control device, to other synchronized playback devices. Therefore, it is possible to configure the synchronized playback system which appropriately performs a process relevant to movement of the control device between the groups and flexibly changes the configuration of the network for a request of the user.

A synchronized playback apparatus according a technique disclosed in the present application is a synchronized playback apparatus which performs synchronized playback on a content file, which is delivered through a network from a delivery server in which the content file is stored, the synchronized playback apparatus including: a first playback device that reproduces the content file; and a control device that performs control of the synchronized playback on the content file with second playback devices included in other synchronized playback apparatuses which are connected to the network.

The synchronized playback apparatuses include the control devices and the playback devices. Meanwhile, not all the synchronized playback apparatuses are required to include the control devices. In a case of being set as the control device, the synchronized playback apparatus performs the synchronized playback on the content file in synchronization with the second playback devices which are included in other synchronized playback apparatuses connected to the network. Otherwise, in a case in which setting is performed such that the synchronized playback apparatus participates in the synchronized playback group as the playback device, the synchronized playback apparatus performs the synchronized playback under the control of a control device which operates in another apparatus. Accordingly, in a case in which functions, which are necessary for the synchronized playback, are dynamically allocated to the apparatuses which are connected to the network, it is possible to configure the synchronized playback apparatus which can flexibly cope with the change in the configuration of the network.

The synchronized playback apparatus according to a technique disclosed in the present application may be also configured such that the synchronized playback apparatus further includes a master device, and the master device selects a second playback device, which is designated from among the second playback devices, as a second synchronized playback device which will participate in a synchronized playback group which performs the synchronized playback with the first playback device, and selects the control device between the second synchronized playback device and the first playback device.

The synchronized playback apparatus includes the master device. The master device constructs the synchronized playback group that is reproduced by synchronizing the synchronized playback apparatus, which includes the master device, with other synchronized playback apparatuses which are connected to the network. The master device selects, for example, the second playback device, which is designated by the user from among the second playback devices included in other synchronized playback apparatuses, as the second playback device which is caused to participate in the synchronized playback group. In addition, the master device selects a control device in a first playback device of the synchronized playback apparatus which includes the master device and the second playback device which is selected to participate. For example, in a case in which the user operates the synchronized playback apparatus, the synchronized playback apparatus, which includes the configuration, automatically sets the playback device, which functions as the master device and participates in the synchronized playback group, and sets the playback device (synchronized playback apparatus) which operates as the control device. Accordingly, it is possible to configure the synchronized playback apparatus which can flexibly cope with the change in the configuration of the network.

A control method according to a technique disclosed in the present application is a control method in a synchronized playback system in which a plurality of synchronized playback apparatuses are connected and perform synchronized playback, each of the plurality of synchronized playback apparatuses including a playback device that reproduces a content file which is delivered through a network from a delivery server, in which the content file is stored, and a control device that controls the synchronized playback, and the control method including operating the control device by one of the plurality of synchronized playback apparatuses in a case in which the synchronized playback is performed and controlling the synchronized playback of a plurality of synchronized playback devices, which participate in a synchronized playback group, of the playback devices which are included in the plurality of respective synchronized playback apparatuses.

In the synchronized playback system, each of the synchronized playback apparatuses includes the control device and the playback device. In the control method of the synchronized playback system, in a case in which the synchronized playback is performed, any one of the plurality of synchronized playback apparatuses which participate in the synchronized playback group is caused to operate the control device. The synchronized playback apparatus, in which the control device operates, controls playback devices, which are included in other synchronized playback apparatuses that participate in the synchronized playback group, as the synchronized playback devices which perform the synchronized playback. In the configuration, it is possible for any one of the synchronized playback apparatuses, which participate in the synchronized playback group, to perform the synchronized playback by dynamically functioning as the control device and controlling the playback devices of other synchronized playback apparatuses. Accordingly, in a case in which a function which is necessary for the synchronized playback is dynamically allocated to the synchronized playback apparatuses which are connected to the network, it is possible to configure the synchronized playback system which can flexibly cope with the change in the configuration of a network.

Advantageous Effects of Invention

According to the technology disclosed in the present application, it is possible to provide a synchronized playback system, a synchronized playback apparatus, and a control method which are capable of flexibly coping with the change in the configuration of the network which performs synchronized playback.

BRIEF DESCRIPTION OF DRAWINGS

FIGS. 9(a) and 9(b) are diagrams illustrating a processing operation in which an audio apparatus which is connected through a home network according to the related art reproduces the music data which is stored in an audio delivery server.

DESCRIPTION OF EMBODIMENTS

Hereinafter, an embodiment in which the present invention is realized will be described with reference to the accompanying drawings.

Figure 1:
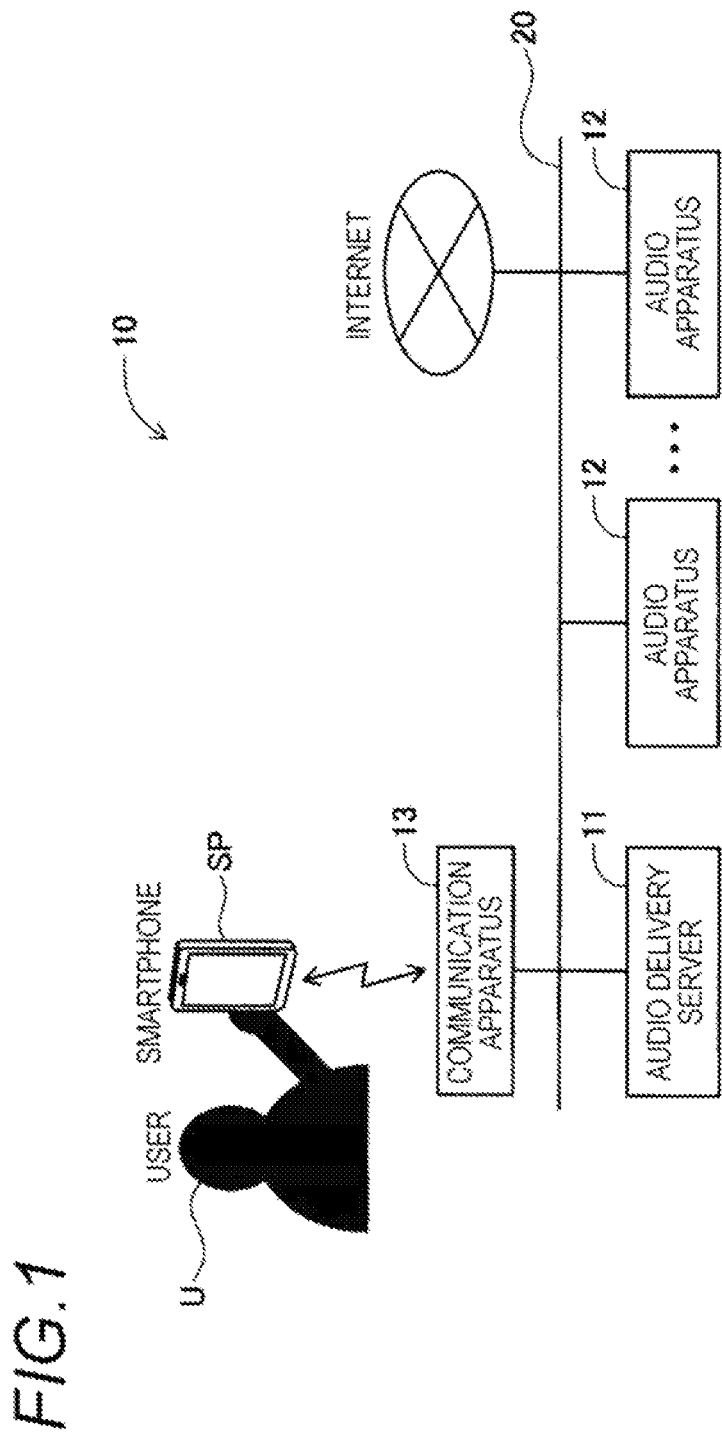
FIG. 1 is a diagram illustrating an audio synchronized playback system according to an embodiment.

FIG. 1 illustrates an example of the configuration of a network in an audio synchronized playback system 10 according to the embodiment. In the audio synchronized playback system 10 (hereinafter, there is a case of being simply referred to as a "system") illustrated in FIG. 1, an audio delivery server 11 and a plurality of audio apparatuses 12 are connected to a network 20. In addition, a communication apparatus 13 controls the connection between the audio delivery server 11, the audio apparatuses 12, and a smartphone SP through the network 20, as will be described later. The network 20 is a network which connects the audio apparatuses 12 which are installed in, for example, a plurality of rooms in one building to each other.

The audio delivery server 11 is, for example, a network storage such as a Network Attached Storage (NAS), and preserves music data which are reproduced by the audio apparatuses 12. Meanwhile, the audio delivery server 11 can preserve or deliver a content file such as the music data, and may be, for example, a server, which can perform file sharing, other than the network storage, or a personal computer. In addition, the audio delivery server 11 may be configured to store and deliver a content file other than the music data, for example, audio data other than music, video, pictures, text, or the like. In addition, the file format of the music data includes, for example, MP3, WAV, Sound VQ (registered trade mark), WMA (registered trade mark), AAC, and the like.

The plurality of audio apparatuses 12 are apparatuses which process and reproduce the music data which are received from the audio delivery server 11, and include, for example, an AV receiver or an AV amplifier in which a speaker, a television, and the like are connected, a speaker system in which an amplifier is embedded, a CD player, and the like. The system 10 synchronizes the plurality of audio apparatuses 12 which are connected to the network 20, and reproduces the same music data, which are received from the audio delivery server 11, from a speaker or the like.

The communication apparatus 13 includes a network hub, a router, or the like, and connects the audio delivery server 11 and the audio apparatuses 12 with each other through, for example, a wireless Local Area Network (LAN) in conformity with the Wi-Fi (registered trade mark) standard. The communication apparatus 13 may be configured to be connected to the audio delivery server 11 and the audio apparatuses 12 through wired communication. In addition, the communication apparatus 13 functions as a portable terminal which is operated by a user U, for example, an access point which enables the smartphone SP to be connected to the network 20. In the system 10, the network 20 is connected to an external network such as the Internet. The various devices (the smartphone SP, the audio delivery server 11, the audio apparatuses 12, and the communication apparatus 13) which are connected to the network 20 can download new music data, update data for updating the system, or the like through the Internet.

In the system 10, a synchronized playback group for synchronizing and reproducing the same music data is constructed in the plurality of audio apparatuses 12. In a case in which the system 10 constructs the synchronized playback group, three functions of a playback device, a master device, and a control device are allocated to each of the various devices which are connected to the network 20. Meanwhile, three functions of the playback device, the master device, and the control device are virtualized as, for example, processing modules (programs) which are executed in the processing circuits of the various devices which are connected to the network 20, and it is possible to dynamically allocate the respective functions to arbitrary apparatuses and execute the functions. Therefore, the three functions may be allocated to one apparatus or a plurality of apparatuses. For example, in the audio apparatuses 12, the processing modules which execute the three functions are stored in a memory or the like, and necessary processing modules are executed according to the functions allocated in the synchronized playback group. The playback device is a device which has a function of reproducing the music data. The master device is a device which receives an operation from the user U and constructs the synchronized playback group. In addition, the master device selects a control device in playback devices which participate in the constructed synchronized playback group. The control device is a device which controls synchronized playback of the music data performed by playback devices which participates in the same synchronized playback group.

(In Case in which User U Performs Operation on Smartphone SP)

Subsequently, a case in which the user U operates the smartphone SP will be described as an example of a processing operation in which the system 10 constructs the synchronized playback group with reference to FIG. 2. The example of FIG. 2 includes a case in which the smartphone SP becomes the master device and constructs the synchronized playback group. Meanwhile, in the description below, in order to distinguish between three audio apparatuses 12, description will be performed while the respective audio apparatuses 12 are referred to as audio apparatuses 31, 32, and 33. In step S1 (hereinafter, abbreviated as S1 and the same abbreviation is performed in other steps) illustrated in FIG. 2, the user U performs an operation of starting construction of the synchronized playback group on the smartphone SP. The smartphone SP executes a processing module corresponding to the master device according to the operation performed by the user U (S2), and searches for an apparatus which has the function of the playback device from the apparatuses which are connected to the network 20 (refer to FIG. 1) (S3). For example, the smartphone SP sets the communication apparatus 13 as an access point, and inquires about the apparatuses which are connected to the network 20 using multicast addresses of the network 20. Otherwise, in the system 10, the audio delivery server 11 may prepare an address list in which, for example, the audio apparatuses 31 to 33 which are connected to the network 20 in advance are associated with the network addresses of the respective audio apparatuses 31 to 33, and may search for the playback device based on the address list which is acquired by the smartphone SP from the audio delivery server 11.

The playback devices of the audio apparatuses 31 to 33, which receive a notification from the smartphone SP, transmit pieces of information, such as the network address of the playback devices, the model numbers of the audio apparatuses, the types of connected speakers, installation locations, and a system version, which are necessary to construct the synchronized playback group, to the smartphone SP (S4). The smartphone SP displays the pieces of information which are received from the audio apparatuses 31 to 33 on a display. The user U checks the display of the smartphone SP, and performs an operation of selecting an apparatus, which is desired to participate in the synchronized playback group as the playback device, in the detected audio apparatuses 31 to 33 (S5). As an example, it is assumed that the audio apparatuses 31 and 32 are selected as the playback devices.

Subsequently, the smartphone SP which is the master device selects an apparatus which functions as the control device in the audio apparatuses 31 and 32 which are selected by the user U (S6). The smartphone SP sets, for example, priorities of the audio apparatuses 31 and 32 based on the installation location and the system version, and selects an apparatus, which a higher priority, as the control device. As an example, it is assumed that the audio apparatus 31 is selected as the control device. In a case in which the above-described process is performed, a synchronized playback group G1 is constructed in which the three functions are allocated to the respective apparatuses in such a way that the smartphone SP is set as the "master device", the audio apparatus 31 is set as the "control device", and the audio apparatuses 31 and 32 are set as the "playback devices". The system 10 performs synchronized playback of the music data from speakers connected to the audio apparatuses 31 and 32 which participate in the synchronized playback group G1 constructed as above. Meanwhile, a synchronized playback process of the system 10 will be described later.

(Case in which Audio Apparatus is Set as Master Device)

Figure 3:
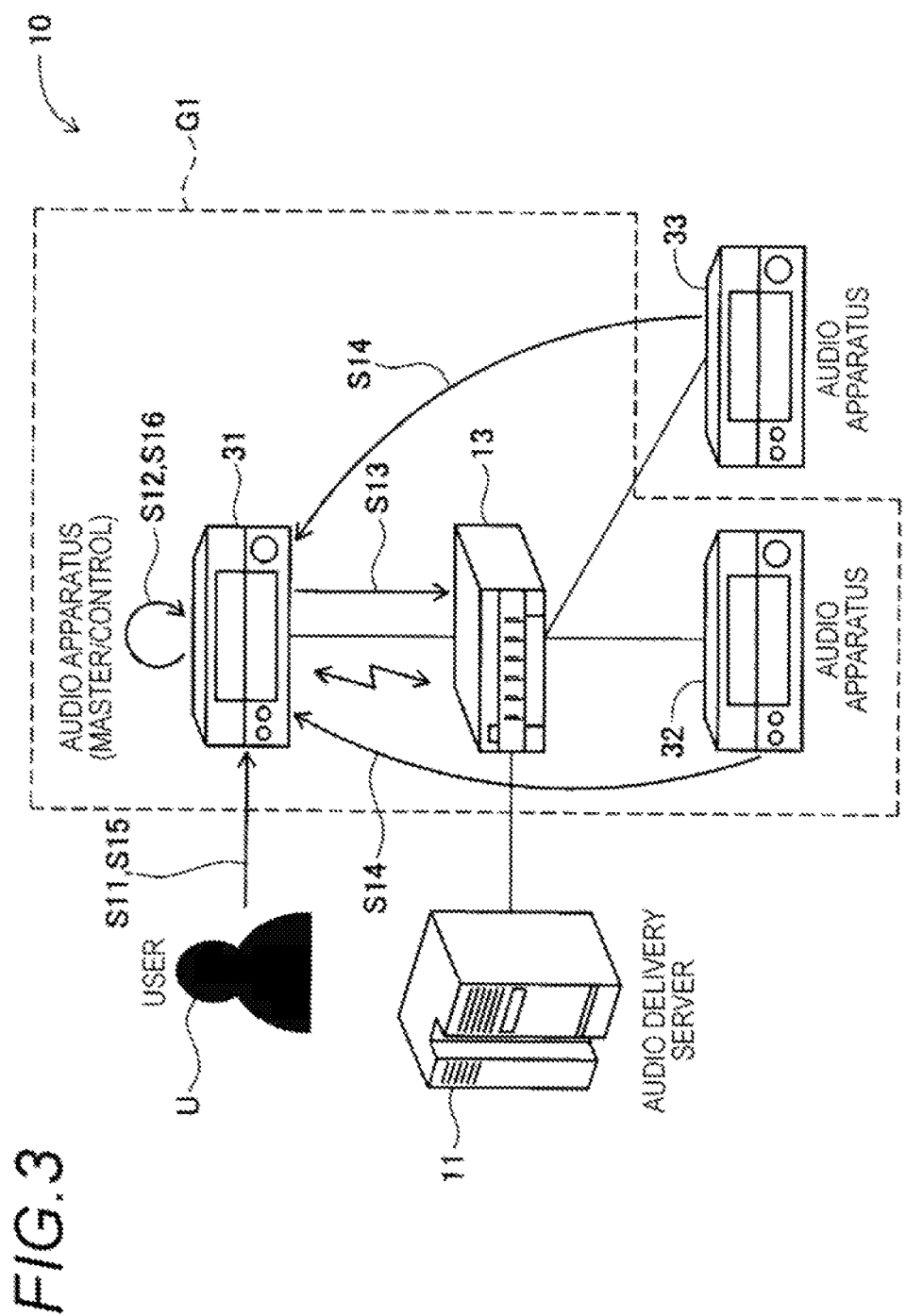
FIG. 3 is a diagram illustrating a processing operation in which an audio apparatus constructs a synchronized playback group as the master device.

Subsequently, a case in which one of the plurality of audio apparatuses 12 functions as the master device will be described with reference to FIG. 3. In S11 illustrated in FIG. 3, the user U performs an operation of starting construction of the synchronized playback group on, for example, the audio apparatus 31. The operation performed on the audio apparatus 31 is performed by, for example, an auxiliary remote controller. Meanwhile, the operation performed on the audio apparatus 31 may be performed by another method, for example, by an operation button included in the audio apparatus 31. The audio apparatus 31 executes a processing module corresponding to the master device according to the operation of the user U (S12), and searches for an apparatus which has a function of the playback device from the apparatuses which are connected to the network 20 (S13). The audio apparatus 31 inquires about the apparatuses which are connected to the network 20. The audio apparatuses 32 and 33, which receive a notification from the audio apparatus 31, transmit pieces of information, which are necessary for the synchronized playback, to the audio apparatus 31 (S14). The audio apparatus 31 displays the pieces of information, which are received from the audio apparatuses 32 and 33, on a body Fluorescent Display Tube (FL). In the case illustrated in FIG. 3, the audio apparatus 31, which is the master device, also has a function of the playback device. Therefore, the audio apparatus 31 displays the apparatus name thereof in the list of the body FL. The user U checks the display of the audio apparatus 31, and performs an operation of selecting a device, which is caused to participate in the synchronized playback group as the playback device, in the audio apparatuses 31 to 33 (S15). As an example, it is assumed that the audio apparatuses 31 and 32 are selected as the playback devices. The audio apparatus 31 selects an apparatus which functions as the control device in the audio apparatuses 31 and 32 which are selected by the user U (S16). As an example, it is assumed that the audio apparatus 31 is selected as the control device. In a case in which the above-described process is performed, the audio apparatus 31 becomes an apparatus to which three functions of the "master device", the "control device" and the "playback device" are allocated. In addition, the audio apparatus 32 becomes an apparatus to which the function of the "playback device" is allocated. Further, in the system 10, the synchronized playback group G1 is constructed in which the audio apparatuses 31 and 32 perform synchronized playback.

(Case in which Plurality of Synchronized Playback Group is Constructed)

Subsequently, a case in which two synchronized playback groups are constructed in the same network 20 will be described with reference to FIG. 4. In the system 10 illustrated in FIG. 4, four audio apparatuses 31 to 34, the audio delivery server 11, and two smartphones SP and SP2 are connected to the network 20. First, in S21 illustrated in FIG. 4, the user U causes the smartphone SP to function as the master device according to the above-described procedure illustrated in FIG. 2, and constructs the synchronized playback group G1 in which the two audio apparatuses 31 and 32 participate. Subsequently, the user U performs an operation of constructing the synchronized playback group on the smartphone SP2 (S22). The user U who operates the smartphone SP2 may be another user of the user U who operates another smartphone SP. For example, the user U operates the smartphone SP and constructs the synchronized playback group G1 of the audio apparatuses 31 and 32 which are provided in one party place. In addition, the another user U operates the smartphone SP2 and constructs a synchronized playback group G2 of the audio apparatuses 33 and 34 which are provided in another party place. Meanwhile, the system 10 may be configured to construct two synchronized playback groups G1 and G2 by an operation performed on one smartphone SP.

The smartphone SP2 executes a processing module corresponding to the master device according to the operation of the user U (S23), and searches for apparatuses which have a function of playback devices from the apparatuses which are connected to the network 20 (S24). Accordingly, the smartphone SP2 functions as the master device which constructs another synchronized playback group G2 from the synchronized playback group constructed by the smartphone SP. The smartphone SP2 inquires about, for example, all of the apparatuses which are connected to the network 20. The audio apparatuses 31 to 34, which received a notification from the smartphone SP2, transmit pieces of information, which are necessary to construct the synchronized playback group, to the smartphone SP2 (S25). In S25, the audio apparatuses 31 and 32, which already participated in the synchronized playback group G1, notify pieces of information (for example, a group ID) about the synchronized playback group G1, in which the audio apparatuses 31 and 32 participated, to the smartphone SP2. The smartphone SP2 displays the pieces of information, which are received from the audio apparatuses 31 to 34, on a display. In this case, it is preferable that the smartphone SP2 display a gist in which the audio apparatuses 31 and 32 already participated in the synchronized playback group G1. The user U checks the display of the smartphone SP2, and performs an operation of selecting devices, which participate in the synchronized playback group G2 as the playback devices, in the audio apparatuses 31 to 34 (S26). As an example, it is assumed that the audio apparatuses 33 and 34 are selected as the playback devices. The smartphone SP2 selects, for example, the audio apparatus 33 as the control device in the audio apparatuses 33 and 34 which are selected by the user U (S27). In a case in which the above-described process is performed, the synchronized playback group G2 is constructed in which functions are allocated to the respective apparatuses in such a way that the smartphone SP2 is set as the "master device", the audio apparatus 33 is set as the "control device" and the "playback device", and the audio apparatus 34 is set as the "playback device".

(Case in which Audio Apparatuses which Already Participated in Synchronized Playback Group are Selected)

Figure 4:
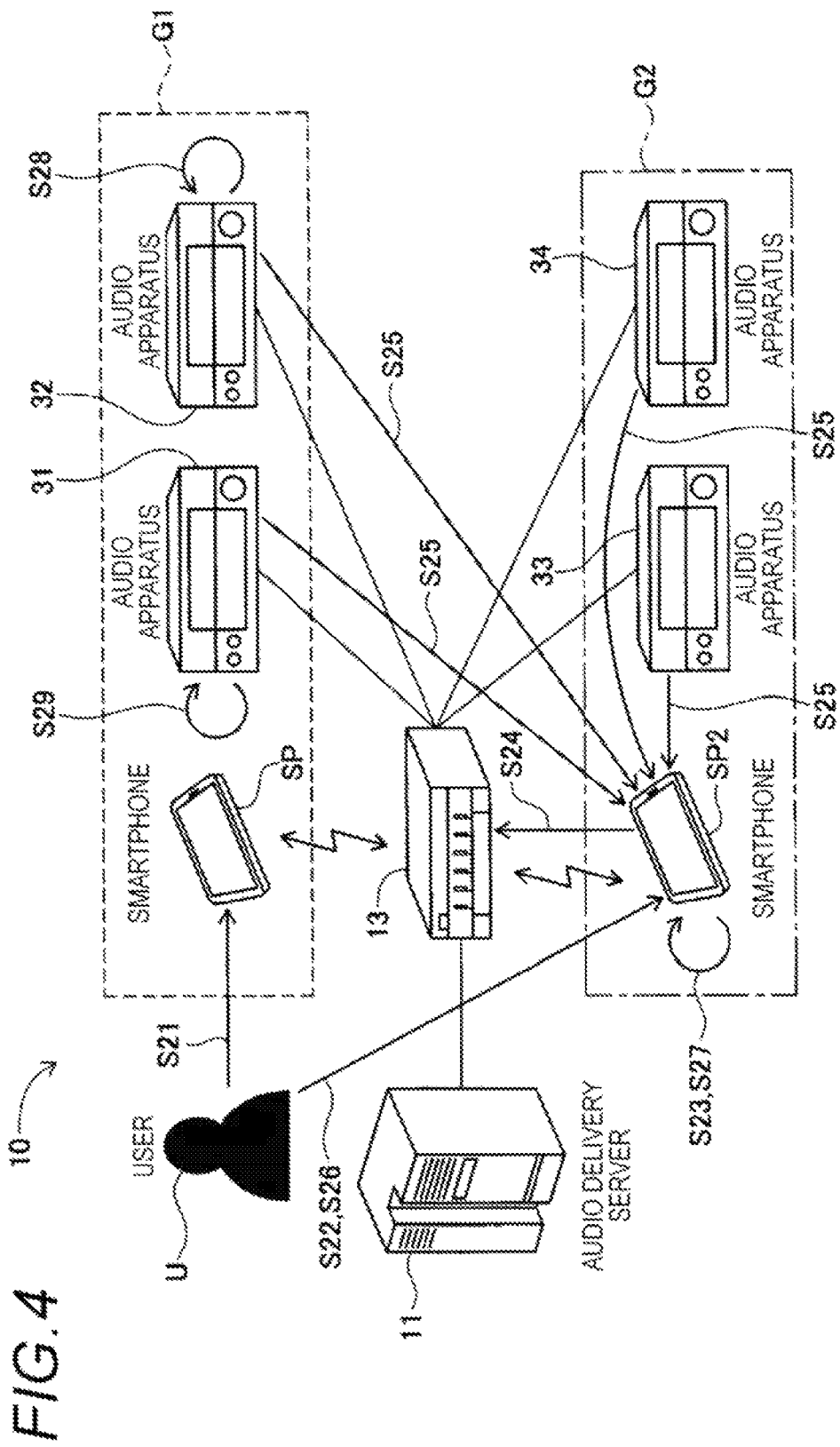
FIG. 4 is a diagram illustrating a processing operation of constructing a plurality of synchronized playback groups.
Figure 5:
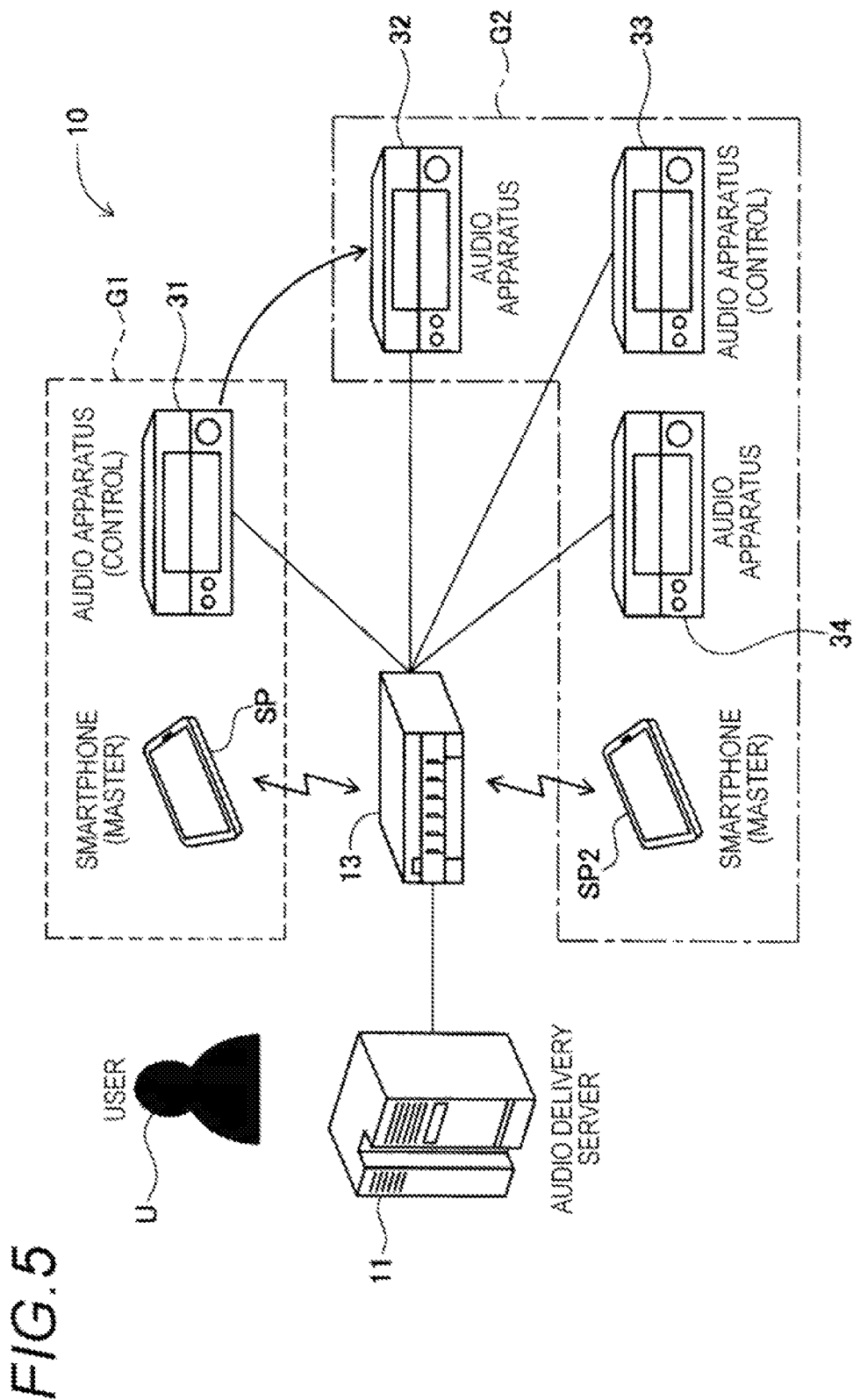
FIG. 5 is a diagram illustrating a state acquired after an audio apparatus (playback device), which already participates in a synchronized playback group, is moved to another synchronized playback group.

In S26 of FIG. 4 which is described above, the user U can select the audio apparatuses 31 and 32, which already participated in the synchronized playback group G1, from the display of the smartphone SP2. In this case, the system 10 performs a process of causing the selected audio apparatuses 31 and 32 to leave from the synchronized playback group G1 and to participate in the new synchronized playback group G2. For example, in S26 illustrated in FIG. 4, the user U selects the audio apparatus 32 (playback device), which participates in the synchronized playback group G1, as the playback device, which is caused to participate in the synchronized playback group G2, in addition to the audio apparatuses 33 and 34. Meanwhile, in S26, a case in which the audio apparatus 31 (control device) is selected will be described later. The smartphone SP2 selects, for example, the audio apparatus 33 as the control device (S27). In contrast, in order to leave from the synchronized playback group G1, the playback device of the audio apparatus 32 notifies a gist to leave the group to the audio apparatus 31 which is the control device of the synchronized playback group G1 (S28). The audio apparatus 31 updates, for example, pieces of information of the audio apparatuses which participate in the synchronized playback group G1, and notifies a gist in which an updating process is completed to the audio apparatus 32. In a case in which the audio apparatus 32 receives the gist, in which the updating process is completed, from the audio apparatus 31, the audio apparatus 32 provides a notification, in which the audio apparatus 32 is in a state in which it is possible to participate in the synchronized playback group G2, to the audio apparatus 33 which is the control device of the synchronized playback group G2 in which the audio apparatus 32 will newly participate. The audio apparatus 33 receives the notification from the audio apparatus 32, updates pieces of information of the audio apparatuses which participate in the synchronized playback group G2, and notifies the gist in which the updating process is completed to the audio apparatus 32. In a case in which the above-described process is performed, two synchronized playback groups G1 and G2 illustrated in FIG. 5 are constructed in the system 10. In the synchronized playback group G1, functions are allocated in such a way that the smartphone SP is set as the "master device", and the audio apparatus 31 is set as the "control device" and the "playback device". In addition, in the synchronized playback group G2, functions are allocated in such a way that the smartphone SP2 is set as the "master device", the audio apparatus 33 is set as the "control device" and the "playback device", and the audio apparatuses 32 and 34 are set as the "playback device". Meanwhile, in a case in which one playback device participates in the synchronized playback group G1, the audio apparatus 31 may, for example, notify the gist to the smartphone SP (master device) and stop a processing module corresponding to the control device.

(In Case in which Control Device which Already Participates in Synchronized Playback Group is Selected)

Figure 6:
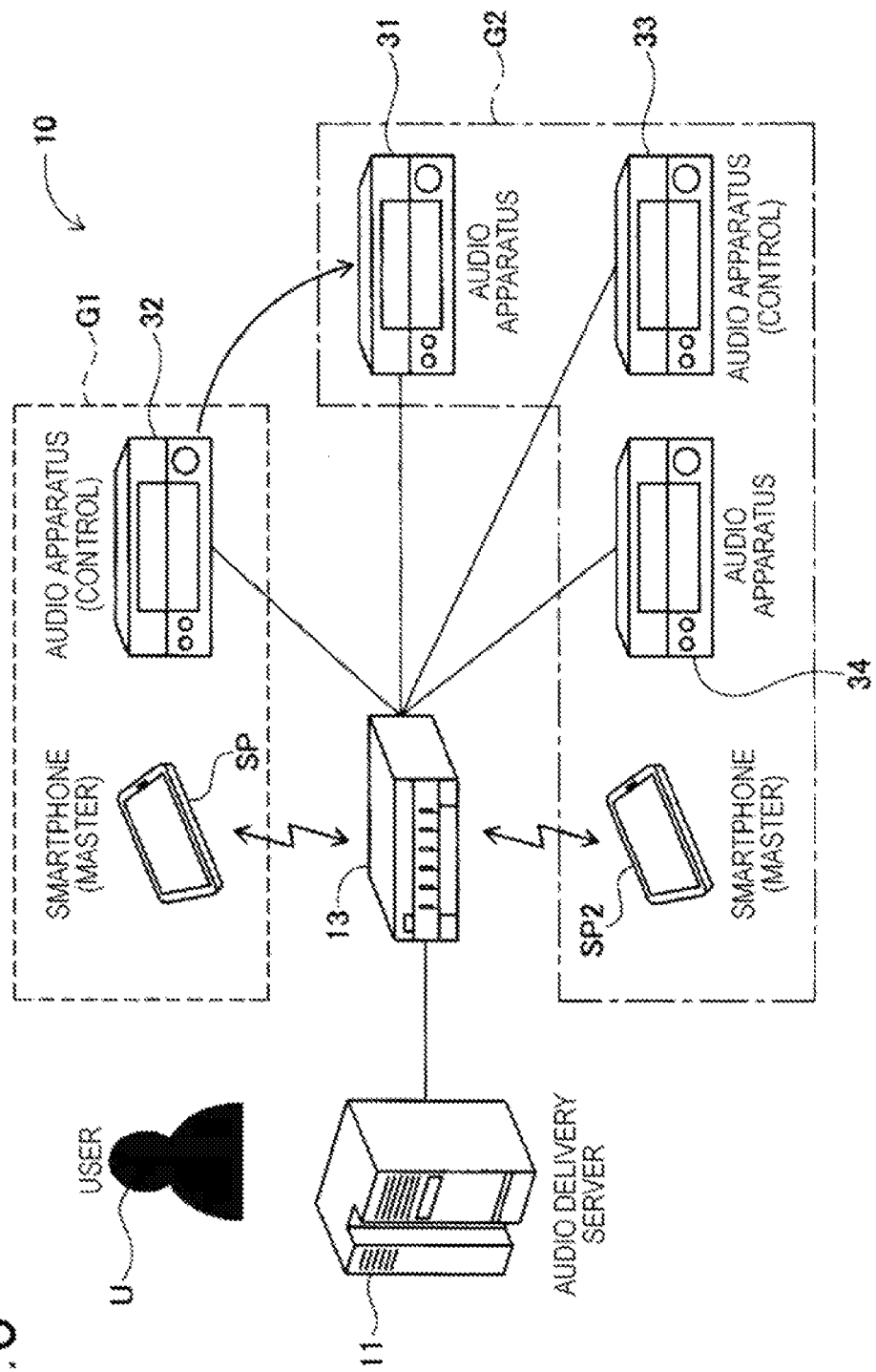
FIG. 6 is a diagram illustrating a state acquired after the audio apparatus (control device), which already participates in the synchronized playback group, is moved to another synchronized playback group.

In S26 of FIG. 4 which is described above, the user U can select the audio apparatus 31, which is the control device, in the audio apparatuses 31 and 32 which already participate in the synchronized playback group G1. In this case, the system 10 performs a process of causing the selected audio apparatus 31 to leave from the synchronized playback group G1 and to participate in the new synchronized playback group G2, and devolving authority as the control device in the synchronized playback group G1. For example, in S26 illustrated in FIG. 4, the user U selects the audio apparatus 31 in addition to the audio apparatuses 33 and 34 as the playback device which participates in the synchronized playback group G2. The smartphone SP2 selects, for example, the audio apparatus 33 as the control device (S27). In contrast, since the audio apparatus 31 functions as the control device, the smartphone SP2 performs a process of causing the audio apparatus 32, which participates in the same group to function, as the control device (S29). Meanwhile, in a case in which a plurality of other audio apparatuses (playback devices), which participate in the synchronized playback group G1, exist, the audio apparatus 31 sets priorities and selects an apparatus which has the highest priority as the control device based on, for example, the system versions of the respective audio apparatuses. The audio apparatus 31 notifies pieces of information, such as a list of apparatuses (audio apparatuses and smartphones) which participate in the synchronized playback group G1, in conjunction with, for example, the information of the gist to leave the group to the audio apparatus 32. The audio apparatus 32 starts the processing module corresponding to the control device, and deletes the audio apparatus 31 from the list of the apparatuses which participate in the synchronized playback group G1. The audio apparatus 32 notifies a gist in which a list updating process is completed to the leaving audio apparatus 31. In a case in which the audio apparatus 31 receives the notification from the audio apparatus 32, the audio apparatus 31 performs a process to participate in the synchronized playback group G2. In addition, the audio apparatus 32 notifies a gist in which the audio apparatus 32 starts an operation as the control device to other apparatuses which participate in the synchronized playback group G1. Meanwhile, since a process in which the audio apparatus 31 moves a group from the synchronized playback group G1 to the synchronized playback group G2 is the same as a process in a case illustrated in FIG. 5, the description thereof will not be repeated. In a case in which the above-described process is performed, two synchronized playback groups G1 and G2 illustrated in FIG. 6 are constructed in the system 10. In the synchronized playback group G1, functions are allocated in such a way that the smartphone SP is set as the "master device", the audio apparatus 32 is set as the "control device" and the "playback device". In addition, in the synchronized playback group G2, functions are allocated in such a way that the smartphone SP2 is set as the "master device", the audio apparatus 33 is set as the "control device" and the "playback device", and the audio apparatuses 31 and 34 are set as the "playback devices".

(Process of Synchronized Playback of Music Data)

Figure 7:
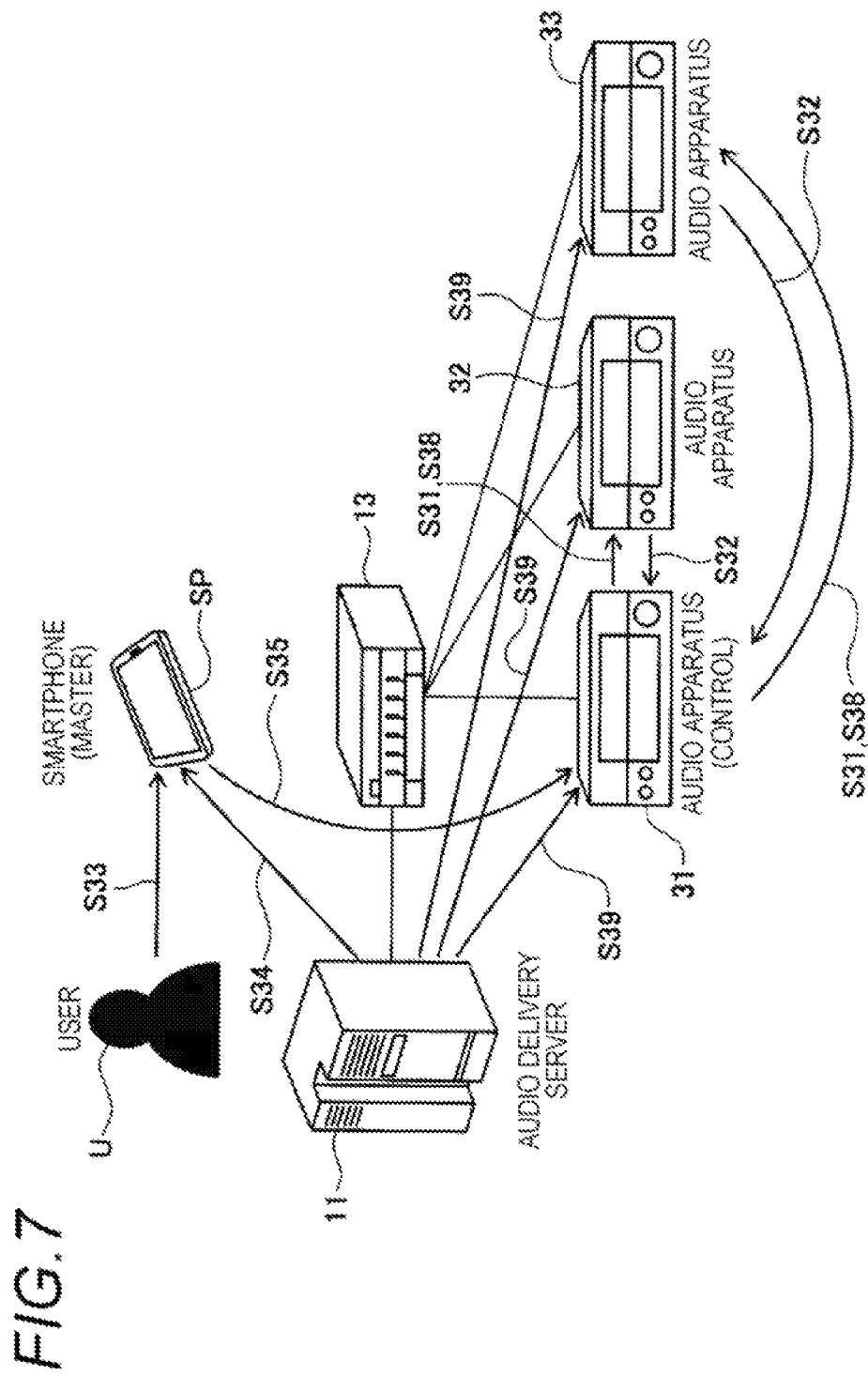
FIG. 7 is a diagram illustrating a processing operation in which the plurality of audio apparatuses are synchronized and reproduce music data.

Subsequently, a process of reproducing music data while a plurality of audio apparatus are synchronized will be described with reference to FIG. 7. In the description below, a case in which the smartphone SP and the audio apparatuses 31 to 33 illustrated in FIG. 7 participate in the same group in a case in which the above-described synchronized playback group is constructed will be described. In the example illustrated in FIG. 7, functions are allocated in such a way that the smartphone SP is set as the "master device", the audio apparatus 31 is set as the "control device" and the "playback device", and the audio apparatuses 32 and 33 are set as the "playback devices". First, in a case in which the synchronized playback group is constructed, the audio apparatus 31, which is the control device, notifies time information, which is used to adjust synchronized playback timing, to other audio apparatuses 32 and 33 which are playback devices (S31). The audio apparatuses 32 and 33 determine music data reproduction time, which is notified by the audio apparatus 31 again, based on the notified time information. In addition, the audio apparatuses 32 and 33 notify information which is necessary for synchronized playback to the audio apparatus 31 (S32). The information which is necessary for the synchronized playback is, for example, delay time on the process performed by the audio apparatuses 32 and 33 until a process of acquiring the music data from the audio delivery server 11 starts from when an instruction to reproduce the music data is received from the audio apparatus 31.

The user U performs an operation of starting reproduction for the smartphone SP (S33). On the smartphone SP, for example, a list, which is prepared by inquiring about the music data stored in a plurality of audio delivery servers 11 connected to the network 20, is displayed (S34). The user U selects music data, which is desired to be reproduced, from the display of the smartphone SP. The smartphone SP notifies an audio delivery server 11 in which the music data selected by the user U is stored, a file name of the music data that should be acquired, and the like, to the audio apparatus 31 (S35). The audio apparatus 31 notifies storage information of the music data, which is received from the smartphone SP and which should be reproduced, and time, in which the reproduction starts, to other audio apparatuses 32 and 33 (S38). The audio apparatuses 32 and 33 acquire the music data from a designated audio delivery server 11 and perform a decoding process. At this time, the audio apparatuses 32 and 33 start reproduction of the music data by adjusting timing based on the reproduction time which is notified by the audio apparatus 31 and the time information which is previously notified in S31 (S39). Meanwhile, the audio apparatus 31 notifies a storage location of the music data of a subsequent song and reproduction timing to the audio apparatuses 32 and 33 according to, for example, timing in which reproduction of a first song is completed. The audio apparatuses 32 and 33 start reproduction of the subsequent song based on the notified information. As described above, the system 10 performs reproduction in which the music data selected by the user U is synchronized by the audio apparatuses 31 to 33.

(Case in which New Playback Device Participates in Synchronized Playback Group During Synchronized Playback)

Subsequently, a case, in which a new playback device participates during the synchronized playback, will be described with reference to FIG. 8. In description below, it is assumed that the smartphone SP (the master device), the audio apparatus 31 (the control device or the playback device), and the audio apparatus 32 (the playback device) participate in the synchronized playback group G1 illustrated in FIG. 8 and the synchronized playback is performed. In addition, the audio apparatus 33 which is connected to the same network 20 (refer to FIG. 1) is in a state in which electric power is turned off. For example, it is assumed that the audio apparatus 33 participates in the synchronized playback group G1 before electric power is turned off.

Figure 8:
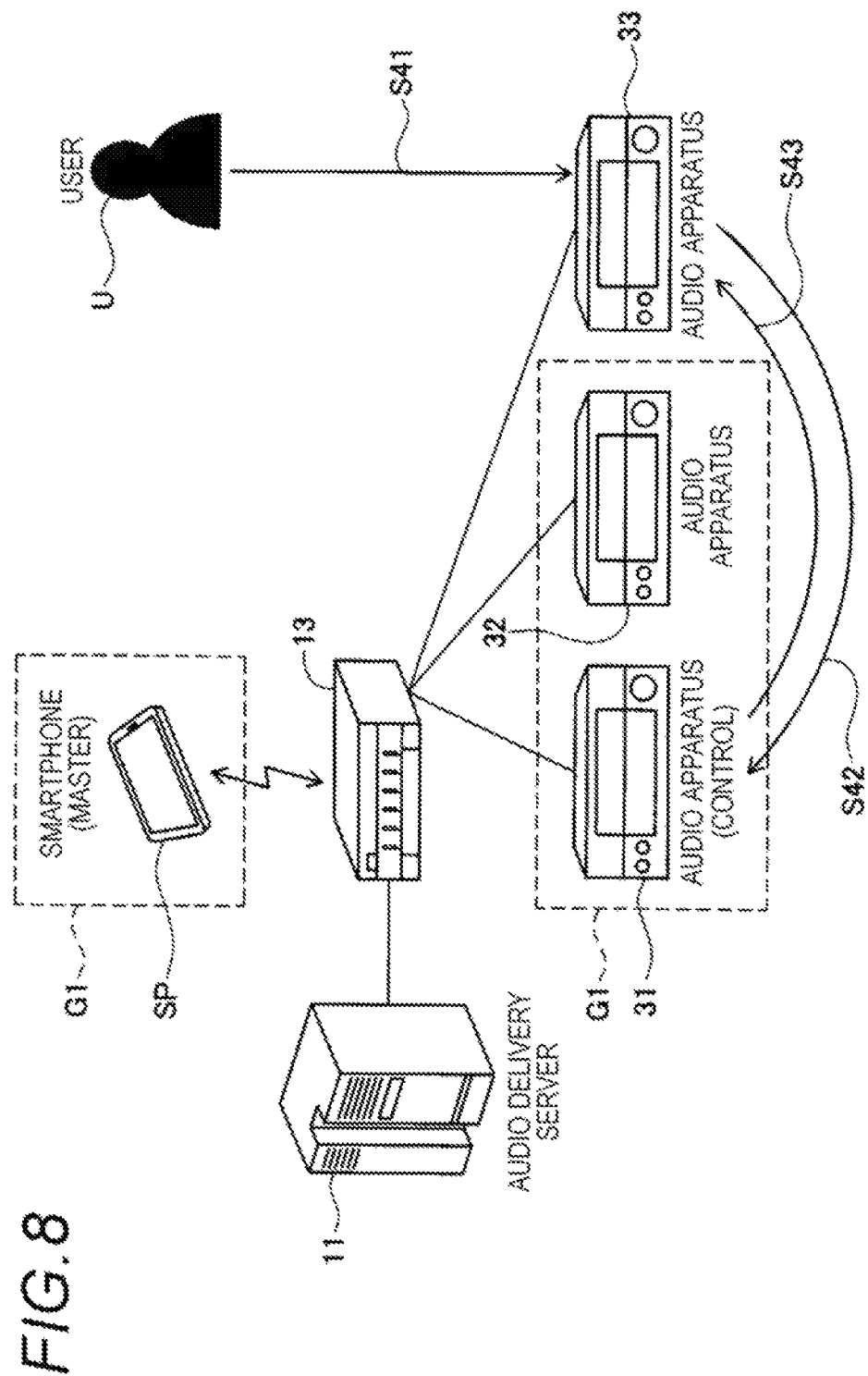
FIG. 8 is a diagram illustrating a processing operation which is performed in a case in which a new audio apparatus participates in the synchronized playback group during the synchronized playback.
Figure 10:
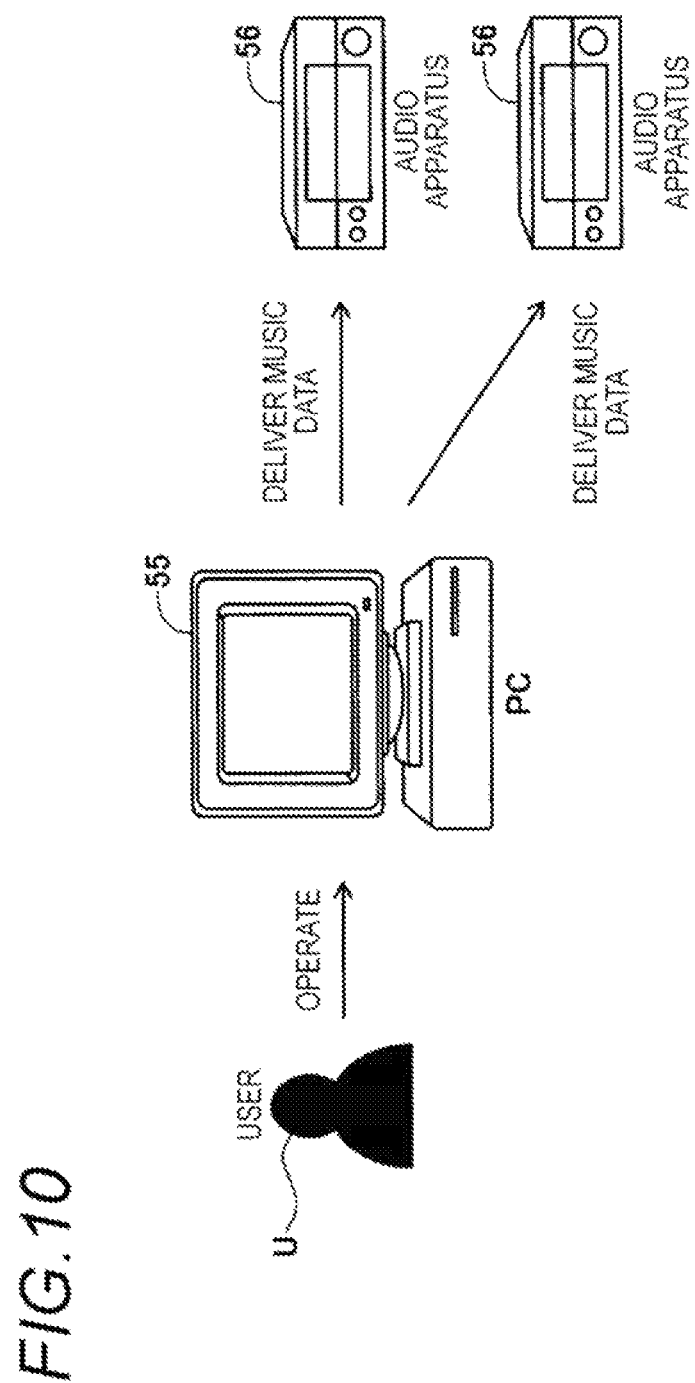
FIG. 10 is a diagram illustrating a processing operation of the synchronized playback which is performed by the plurality of audio apparatuses which are connected through the same network according to the related art.

In this case, in S41 of FIG. 8, the user U turns on electric power of the audio apparatus 33, and sets participation in the synchronized playback group G1 in which the audio apparatus 33 participated before electric power is turned off. The audio apparatus 33 inquires the audio apparatus 31, which is the control device of the synchronized playback group G1, about participation in the group (S42). Meanwhile, in a method in which the audio apparatus 33 determines the control device, the control device may be determined based on information of the group in which the audio apparatus 33 participated before electric power is turned off or may be selected by the user U by inquiring apparatuses on the network 20 through broadcasting and displaying the results thereof on the body FL. The audio apparatus 31 notifies a gist that the information of the audio apparatus which participates in the synchronized playback group G1 is updated and the updating process is completed, to the audio apparatus 33 (S43). Meanwhile, the audio apparatus 31 may perform a process of combining synchronized playback timing (time information notification or notification of information which is necessary for synchronized playback (processes corresponding to S31 and S32 of FIG. 7)) in S43. Further, the audio apparatus 31 provides a notification that the audio apparatus 33 starts reproduction in addition to the audio apparatus 32 in, for example, timing in which reproduction of a subsequent song starts. Therefore, in the system 10, synchronized playback of the audio apparatus 33, which newly participates in the synchronized playback group G1, starts.

Hereinabove, according to the above-described embodiments, effects below are acquired.

<First Effect>

In the audio synchronized playback system 10 according to the embodiment, the respective functions of the master device, the control device, and the playback device are allocated to the respective apparatuses which are connected to the network 20. In the example illustrated in FIG. 2, smartphone SP which is the master device constructs the synchronized playback group G1 based on the operation of the user U. The smartphone SP performs setting such that the audio apparatuses 31 and 32, which are designated by the user U in the plurality of audio apparatuses 31 to 33 which are connected to the network 20, are caused to participate in the synchronized playback group G1. In addition, the smartphone SP sets the audio apparatus 31, in the audio apparatuses 31 and 32 on which setting is performed to cause the apparatuses 31 and 32 to participate in the synchronized playback group G1, as the control device. The audio apparatus 31, which is set as the control device, controls synchronized playback performed with the audio apparatus 32 which participates in the synchronized playback group G1. In the configuration, in a case in which the user U selects the audio apparatuses 31 and 32, which will participate in the synchronized playback group G1, for the master device (smartphone SP), the smartphone SP automatically sets an apparatus which operates as the control device between the audio apparatuses 31 and 32 in the synchronized playback group G1. Accordingly, a function, which is necessary for synchronized playback, is dynamically allocated to the apparatuses which are connected to the network 20, and thus the system 10 becomes a synchronized playback system which can flexibly respond to the change in the configuration.

<Second Effect>

Figure 2:
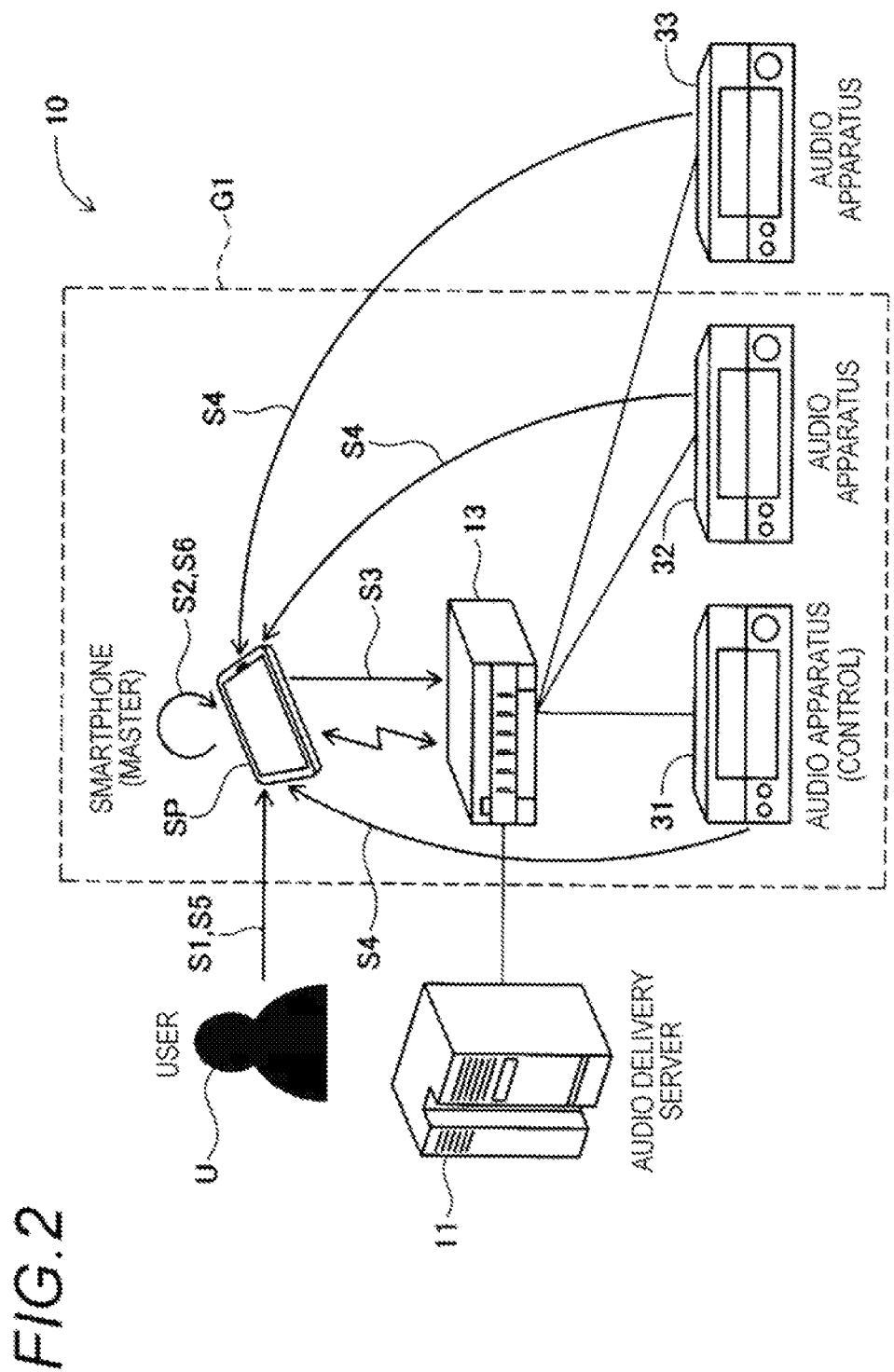
FIG. 2 is a diagram illustrating a processing operation in which a smartphone constructs a synchronized playback group as a master device.

In addition, in the example illustrated in FIG. 2, the smartphone SP searches the plurality of apparatuses, which are connected to the network 20, for the audio apparatuses 31 to 33, which have the function of the playback device, according to the operation of constructing the synchronized playback group G1 by the user U (S3). The audio apparatuses 31 to 33 respond to the smartphone SP with the pieces information, such as network addresses thereof, which are necessary to construct the synchronized playback group G1, according to the inquiry from the smartphone SP (S4). In the configuration, in a case in which the smartphone SP searches the apparatuses, which are connected to the network 20, for apparatuses which can participate in the synchronized playback group G1 as the playback device and displays the found apparatuses, the user U can easily select the audio apparatuses 31 to 33 (synchronized playback devices) which are desired to be caused to participate in the synchronized playback group G1.

<Third Effect>

The examples illustrated in FIGS. 4 and 5 illustrates the case in which the operation of causing the audio apparatus 32 (synchronized playback device) which already participated in the synchronized playback group G1 to participate in another synchronized playback group G2 is performed by the user U. In a case in which the user U performs the operation of causing the audio apparatus 32 to participate in the new synchronized playback group G2, the audio apparatus 32 notifies the gist, in which the audio apparatus 32 leaves the group, to the audio apparatus 31 which is the control device of the synchronized playback group G1 in which the audio apparatus 32 is participating (S28). The audio apparatus 31 updates the pieces of information about the audio apparatuses which participate in the synchronized playback group G1, and notifies the gist in which the updating process is completed to the audio apparatus 32. In a case in which the audio apparatus 32 receives the gist, in which the updating process is completed, from the audio apparatus 31, the audio apparatus 32 provides a notification, in which the audio apparatus 32 is in a state in which it is possible to participate in the group, to the audio apparatus 33 which is the control device of the newly participating synchronized playback group G2. Accordingly, the system 10 can appropriately perform a process relevant to the movement of the audio apparatus 32, which is the synchronized playback device, between the groups and can flexibly change the configuration of the network for a request of the user U.

<Fourth Effect>

The examples illustrated in FIGS. 4 and 6 illustrates the case in which the operation of causing the audio apparatus 31 (the control device or the synchronized playback device) which already participates in the synchronized playback group G1 to participate in another synchronized playback group G2 is performed by the user U. In a case in which the user U performs the operation of causing the audio apparatus 31 to participate in the new synchronized playback group G2, the audio apparatus 31 sets the audio apparatus 32, which participates in the synchronized playback group G1, as a new control device (S29). The audio apparatus 32, which is newly set as the control device, starts a processing module corresponding to the control device, and deletes the audio apparatus 31 from the list of apparatuses which participate in the synchronized playback group G1. The audio apparatus 32 notifies the gist, in which the list updating process is completed, to the leaving audio apparatus 31. In addition, the audio apparatus 32 notifies a gist that the audio apparatus 32 starts an operation as the control device, to the apparatuses which participate in the synchronized playback group G1. Therefore, the system 10 can appropriately perform a process relevant to the movement of the audio apparatus 31, which is the control device, between the groups and can flexibly change the configuration of the network for a request of the user U.

Meanwhile, the present invention is not limited to the above embodiment, and it is apparent that various improvements and modifications are possible in a scope without departing from the gist of the present invention. For example, the audio apparatuses 12 do not necessarily include all of the master device, the control device, and the playback device and may be configured to include any one of the devices.

In addition, the audio apparatuses 12, which do not include the control device, may participate in the synchronized playback groups G1 and G2 according to the embodiment. In this case, the audio apparatuses 12, which do not include the control device, operate the playback devices.

In addition, the synchronized playback system in the specification does not necessarily need the master device. For example, in a case in which synchronized playback is performed and information of the synchronized playback device which participates in the synchronized playback group that is constructed in the memory of the like of the audio apparatuses 12 operated by the control device is set in advance, the audio synchronized playback system 10 does not need setting performed by the master device.

In addition, a content file which is a target of the synchronized playback is not limited to the music data, and may be a moving image, a still image, the text, or the combination thereof. In addition, the synchronized playback group is not limited to two groups, and three or more groups may be configured on the same network.

A portable terminal which is operated by the user U is not limited to the smartphone SP, and may be other apparatuses, such as a tablet-type terminal, a note-type PC, and a Personal Data Assistants (PDA: portable information terminal), which can be carried.

The audio delivery server 11 may participate in the synchronized playback groups G1 and G2 according to the embodiment. In this case, the audio delivery server 11 may be configured to include the master device, the control device, and the playback device. Otherwise, the function of the audio delivery server may be configured to be provided to the smartphone or the audio apparatus.

Figure 11:
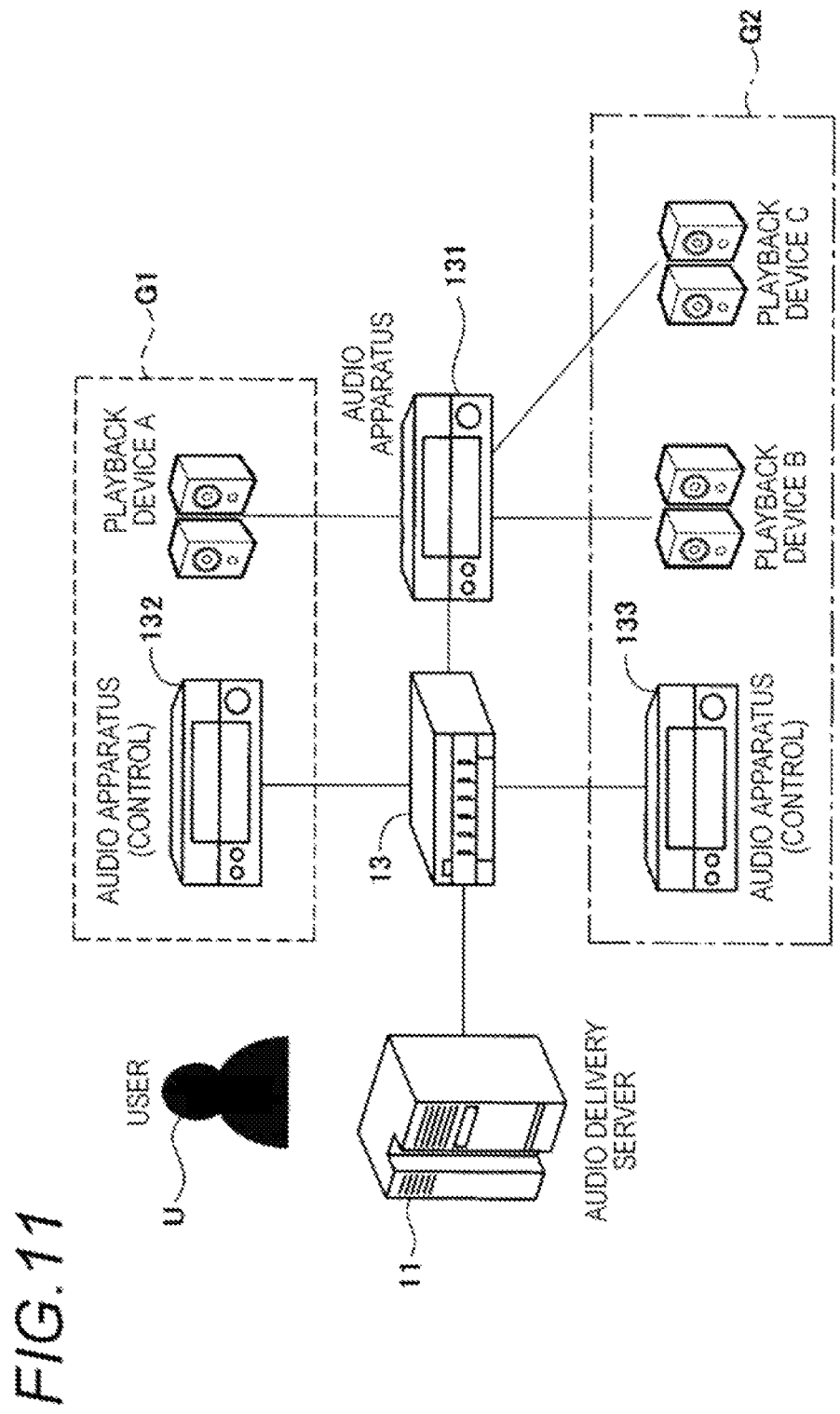
FIG. 11 is a diagram illustrating an example in which the synchronized playback group is constructed in a case in which the same audio apparatus includes a plurality of playback devices.

In the embodiment, an example, in which the apparatus itself, such as the smartphone or the audio apparatus, participates in a specific synchronized playback group in a case in which the synchronized playback group is constructed, is described. However, there is a case in which the apparatus includes a plurality of playback apparatuses, that is, a case in which the apparatus includes a plurality of playback devices. In this case, the plurality of playback devices may respectively participate in separate synchronized playback groups instead of the same synchronized playback group. FIG. 11 is a diagram illustrating an example in which the synchronized playback group is constructed in a case in which the same audio apparatus 131 includes a plurality of playback devices A and B. As illustrated in FIG. 11, the playback device A of the audio apparatus 131 participates in the synchronized playback group G1, and the playback devices B and C of the audio apparatus 131 participate in the synchronized playback group G2. The control devices (here, audio apparatus 132 and 133) respectively control the synchronized playback for the playback device A and the playback devices B and C through the audio apparatus 131. Meanwhile, the audio apparatus 131 may participate in the synchronized playback groups G1 and G2, and may function as the master device, the control device, or the playback device. With the configuration, for example, even in a case in which the same apparatus controls the plurality of playback devices, it is possible to respectively control synchronization in the plurality of playback devices if the plurality of playback devices exist in separate indoor rooms.

That is, the audio synchronized playback system 10 is an example of the synchronized playback system. The synchronized playback group G1 is an example of a first synchronized playback group. The synchronized playback group G2 is an example of a second synchronized playback group.

This application is based on Japanese Patent Application No. 2013-240102 filed on Nov. 20, 2013, the contents of which are incorporated herein by reference.

REFERENCE SIGNS LIST

10: audio synchronized playback system
11: audio delivery server
31 to 33: audio apparatus
SP: smartphone
U: user

The invention claimed is:

1. A playback system comprising:
a delivery server storing at least one content file connectable to a network; and
a plurality of playback apparatuses, including at least a first playback apparatus and a second playback apparatus, or at least the first playback apparatus, the second playback apparatus, and a third playback apparatus, connectable to the network, each including a plurality of functions that are selectively actuable, including:
    a playback function that reproduces a content file, among the at least one content file, delivered through the network from the delivery server;
    a control function that controls playback of the content file; and
    a master function that selects one playback apparatus, from among the plurality of playback apparatuses, to provide the control function,
wherein the first playback apparatus, or any other playback apparatus, from among the plurality of playback apparatuses, is selectable to provide the master function, which is configured to:
    transmit a command to the second playback apparatus, or any other playback apparatus, from among the plurality of playback apparatuses, via the network;
    receive information related to construction of a playback group from the second playback apparatus that received the command;
    construct at least one playback group, including a first playback group, that includes first grouped playback apparatuses, including at least the first and second playback apparatuses or at least the first, second, and third playback apparatuses, selected based on a user instruction;
    select one of the first, second, or third playback apparatus, from among the first grouped playback apparatuses participating in the first playback group, to provide the control function, based on the received information; and
wherein the selected one playback apparatus providing the control function is configured to:

in a case where the first playback apparatus is selected to provide the control function, select at least one of the first, second, or third playback apparatus to provide the playback function and control the playback of the content file played by the at least one of the first, second, or third playback apparatus; and in a case where the second playback apparatus is selected to provide the control function, select at least one of the second or third playback apparatus to provide the playback function and control the playback of the content file played by the third playback apparatus.

2. The playback system according to claim 1, further comprising at least one fourth playback apparatus each having the playback function, participating in the first playback group but not including the control function.

3. The playback system according to claim 1, wherein:
the selected first playback apparatus providing the master function searches for the plurality of playback apparatuses connected to the network, and
each of the plurality of playback apparatuses responds to the selected first playback apparatus providing the master function with information relevant to constructing the at least one playback group according to the performed search.

4. The playback system according to claim 1, wherein:
the at least one playback group further includes a second playback group,
in a case where the third playback apparatus selected to provide the playback function, participating in the first playback group, is designated to participate in the second playback group:
the selected third playback apparatus leaving the first playback group notifies the selected second playback apparatus providing the control function that the selected third playback apparatus is leaving the first playback group; and
the selected second playback apparatus providing the control function updates information of the first grouped playback apparatuses participating in the first playback group, and notifies the selected third playback apparatus leaving the first playback group that an updating process is completed.

5. The playback system according to claim 1, wherein:
the at least one playback group further includes a second playback group,
in a case where the second playback apparatus providing the control function, participating in the first playback group, is designated to participate in the second playback group:
the selected second playback apparatus providing the control function selects another playback apparatus, including the third playback apparatus, from among the first grouped playback apparatuses participating in the first playback group; and
the selected another playback apparatus newly providing the control-function:
performs updating of deleting information of the second playback apparatus leaving the first playback group from information of the first grouped playback apparatuses participating in the first playback group;
notifies the second playback apparatus leaving the first playback group that the updating is completed; and notifies all other first grouped playback apparatuses participating in the first playback group of the selected another playback apparatus providing the control function.

6. A control method in a playback system having a delivery server storing at least one content file connectable to a network, and a plurality of playback apparatuses, including at least a first playback apparatus and a second playback apparatus, or at least the first playback apparatus, the second playback apparatus, and a third playback apparatus, connectable to the network,
wherein each of the plurality of playback apparatuses includes a plurality of functions are selectively actuable, including:
a playback function that reproduces a content file, among the at least one content file, delivered through the network from the delivery server;
a control function that controls playback of the content file; and
a master function that selects one playback apparatus, from among the plurality of playback apparatuses, to provide the control function,
wherein the control method comprises the steps of:
selecting the first playback apparatus, or any other play apparatus, from among the plurality of playback apparatuses, to provide the master function;
transmitting a command, using the selected first playback apparatus providing the master function, to the second playback apparatus, or any other playback apparatus, from among the plurality of playback apparatuses, via the network;
receiving, using the selected first playback apparatus providing the master function, information related to construction of a playback group from the second playback apparatus that received the command;
constructing, using the selected first playback apparatus providing the master function, at least one playback group, including a first playback group, that includes grouped playback apparatuses, including at least the first and second playback apparatuses or at least the first, second, and third playback apparatuses, from among the grouped playback apparatuses, selected based on a user instruction;
selecting, using the selected first playback apparatus providing the master function, one of first, second, or third playback apparatus, from among the grouped playback apparatuses participating in the first playback group, to provide the control function, based on the received information; and controlling, using the selected one playback apparatus providing the control function to:
in a case where the first playback apparatus is selected to provide the control function, select at least one of the first, second, or third playback apparatus to provide the playback function and control the playback of the content file played by the at least one of the first, second, or third playback apparatus; and
in a case where the second playback apparatus is selected to provide the control function, select at least one of the second or third playback apparatus to provide the playback function and control the playback of the content file played by the third playback apparatus.

7. The playback system according to claim 1, wherein:
the selected one playback apparatus providing the control function is further configured to:

transmit a time information to the selected at least one of the first, second, or third playback apparatus providing the playback function;
receive delay time information from the selected at least one of the first, second, or third playback apparatus providing the playback function; and
transmit playback time information of the content file calculated based on the delay time information to the selected at least one of the first, second or third playback apparatus providing the playback function, and the selected at least one of the second or third playback apparatus providing the playback function is configured to reproduce the content file delivered from the delivery server based on the time information and the playback time information.

8. The control method according to claim 6, further comprising the steps of:
transmitting, using the selected one playback apparatus providing the control function, a time information to the selected at least one of the first, second, or third playback apparatus providing the playback function;
receiving, using the selected one playback apparatus providing the control function, delay time information from the first selected at least one of the first, second, or third playback apparatus providing the playback function;
transmitting, using the selected one playback apparatus providing the control function, playback time information of the content file calculated based on the delay time information to the selected at least one of the first, second or third playback apparatus providing the playback function; and
reproducing, using the selected at least one of the first, second, or third playback apparatus providing the playback function, the content file delivered from the delivery server based on the time information and the playback time information.

* * * * *